UNITED STATES PATENT OFFICE.

ROBERT HAMILTON HUTCHINSON, OF NEW YORK, N. Y.

LUBRICANT AND PROCESS OF MANUFACTURING SAME.

No. 907,055.

Specification of Letters Patent.

Patented Dec. 15, 1908.

Application filed October 20, 1906. Serial No. 339,841.

*To all whom it may concern:*

Be it known that I, ROBERT H. HUTCHINSON, a citizen of the United States, residing at New York, in the county of New York and State of New York, have invented a new and useful Lubricant and Process of Manufacturing the Same, of which the following is a specification.

The principal object is to provide and produce at small cost a high grade lubricant that can be employed for practically all classes of machinery, that can be readily changed in its consistency to properly coöperate with either heavy or light mechanism, and that may be permanently kept in a fluid state.

The lubricant in its simplest and perhaps preferred form consists of wool fat, mineral oil and water thoroughly commingled. The wool fat that I preferably use in carrying out my invention is a cheap grade of "degras", though I may successfully employ better grades, as for instance that known as "neutral", which is entirely free, or nearly so, of fatty acids. A given amount of water can be stirred into wool fat, say from 100 to 200 per cent., depending upon the grade of the wool fat employed. I have discovered, however, that if wool fat is dissolved in mineral oil, and then water (at cold or normal temperature) added gradually, a little at a time, the mixture being thoroughly stirred, an excessive amount of water can be introduced. For instance, as against 50 parts of wool fat (raw) and 50 parts of water in making one form of lubricant, I have been enabled to incorporate 20 parts of water into one part of wool fat when the latter has been dissolved in six parts of mineral oil.

One process is to first dissolve the wool fat in the oil, and then gradually, with the aid of a mixing machine or implement, mix and beat in the water. Any well known mixer may be successfully employed, though I have found that those having beaters revolving simultaneously in opposite directions, give the most satisfactory and quickest results. The ingredients are mixed together much in the same manner as one would "beat" an egg with an egg beater.

The above described specific process, however, is not the only one that can be employed. For instance, water may be introduced into the wool fat before its incorporation in the mineral oil, the combined fat and water then mixed with the oil, and more water added afterwards. Other slight modifications will of course suggest themselves to those skilled in the art. Moreover, the above process relates more particularly to the better grades of wool fat. Some grades, however, contain fatty acids. For instance, that commercially known as "degras" contains all the way from four to twenty-five per cent. of such acids. As these vegetable or animal acids in their crude state are not desirable in the lubricant, a small quantity of alkali, preferably ammonia, may be added to saponify whatever fatty acids may be contained in the wool fat, thus producing a soap which is important inasmuch as it prevents corrosion of the metal parts by the water. Carrying this feature further, it may be stated that the addition or employment of vegetable or animal oil to the compound, whether incorporated in the wool fat or added separately afterwards, is well within the scope of the present invention.

Upon the specific gravity of the oil and also the cold test depends the quality or character of the lubricant for specific purposes. For instance, if a fluid compound is desired, a light gravity oil is necessary. For certain compounds that it is desired to feed quickly, an oil of from 30 B. up to 50 B., gravity may be employed. On the other hand, if an oil of from 23 B. to 27 B. with a high cold test is used, the compound is heavy, like a gear grease, and will not flow. A compound that has proven to be particularly good for explosive engine cylinder lubrication, contains one part of wool fat, six parts of oil and twenty parts of water. Careful tests have shown that a very much smaller amount of the above than of mineral oil (now almost universally used) will properly lubricate the cylinder and piston while the sparking plugs will remain absolutely clean, so that ignition and combustion is not interfered with. For steam cylinders, one part of wool fat, twenty parts of oil and six parts of water may be employed. For light bearings, such as spindles in cotton mills, one part of wool fat, thirty parts of oil and twenty parts of water may be successfully used.

The above are of course merely examples of the wide variations of proportions and the grades of wool fat and oil that may be employed. It will be evident that for other classes of lubricant, the composition can be readily altered. Moreover, the lubricant can either be prepared in condition for immediate use, or it may be put up in a thicker state to be thinned down by mixture with water and oil to the desired consistency. The right consistency of the composition is like cream of milk, this being largely due to the gradual stirring in of the water. The water which is combined with the wool fat and oil remains with it tenaciously, and enables the lubricant to be introduced to any point desired through lubricators and feed pipes.

It will be observed that water alone is introduced into the mixture and this water is designated "pure" in order to define that water alone, unmixed with other materials, is employed, as distinguished from introduced mixtures in which water forms only a preliminary ingredient, and its character is changed or its action is negatived by its incorporation with the other materials of such mixture, being employed for a totally different purpose.

The compound is particularly advantageous for use in lubricating pistons and cylinders of automobile explosive engines, not only affording better lubrication than that obtained with the ordinary mineral oil, but eliminating to a very material degree the smoke and odor of the exhaust. This is due to the relatively small quantity of grease or oil in the compound as compared with the 100 per cent. straight or pure mineral oil ordinarily used, which burns, producing carbon. This absence, in a large measure, of offensive fumes driven from the exhaust pipe is a very desirable feature in itself. Moreover straight or pure oils become very thin in the cylinder, and are affected by the excessive heat prevailing therein, so that they lose their viscosity or adhesive qualities and splash and rise to the top of the cylinders and valves, there carbonizing, and causing trouble. For lubricating automobile cylinders, comparatively light oils are employed for the reason that very heavy steam-cylinder oils are in most cases too heavy to feed freely through the cylinders. Wool fat alone cannot be used, and therefore the water and the light mineral oil act in the nature of a vehicle to conduct the fat to where it will be of service. The oil and water will separate finally from the wool fat under the stress of heat, and will escape in the form of vapor through the exhaust, leaving the wool fat upon the piston due to its high unctious adhesive nature, so that a permanent film of high class lubricant is always present, and such lubricant is of a nature that will require a higher degree of heat than there is in an explosive engine cylinder to dry it up. This is the reason therefore why so little of the wool fat need be used as compared with the straight mineral oils, and why such wool fat does not cause trouble on the tops of the valves by a concentration of carbon. Further than this, the compound of fat and water is to some extent a cooling ingredient, which helps to keep the temperature of the cylinder lower than it would otherwise be.

Having thus fully described my invention, what I claim as new, and desire to secure by Letters Patent, is:

1. A lubricant including a composition of wool fat, oil and water, the amount of water being greater than the amount of wool fat.

2. A lubricant including a composition of wool fat, mineral oil and water, the amount of water and the amount of oil being each greater than the amount of wool fat.

3. A lubricant including a composition of substantially one part of wool fat, substantially six parts of mineral oil, and substantially twenty parts of water.

4. A fluid emulsified lubricant including a composition of wool fat, dissolved in oil with sufficient water added to the mixture and completely intermingled therewith to constitute a fluid vehicle for the same.

5. A lubricant including a composition formed of wool fat, mineral oil, water and ammonia.

6. The process of producing an emulsified lubricant containing a large proportion of water, said process consisting in dissolving wool fat in oil and adding a sufficient amount of water thereto to produce a fluid emulsion.

7. The process of producing a lubricant which consists in dissolving wool fat in mineral oil, and afterwards adding cold water gradually thereto, the amount of oil and water being greater than the amount of wool fat.

8. The process of producing a lubricant, which consists in mixing wool fat and water, mixing the composition with oil and then adding water into the said latter mixture.

9. The process of producing a lubricant which consists in dissolving a predetermined amount of wool fat in a greater amount of mineral oil, adding an amount of water greater than the wool fat to the mixture and simultaneously stirring the composition while the water is being added.

10. The process of producing a lubricant, which consists in commingling wool fat and mineral oil and adding a sufficient amount of cold water to the mixture to form a fluid emulsion.

11. The process of producing a lubricant, which consists in commingling wool fat and mineral oil, and adding cold water to the mixture by beating the same together.

12. A lubricant comprising a fluid emulsion of commingled wool fat, oil and water, that are separable by the vaporization of the water.

13. The process of producing a lubricant, which consists in commingling an alkali with wool fat containing a fatty acid to saponify said acid, mixing the same with mineral oil, and adding sufficient water to the mixture to form a fluid lubricant.

14. A lubricant composed of wool fat and an emulsified mixture of fatty acid and alkali, mineral oil and an amount of water greater than the amount of wool fat.

In testimony, that I claim the foregoing as my own, I have hereto affixed my signature in the presence of two witnesses.

ROBERT HAMILTON HUTCHINSON.

Witnesses:
　LOUISE A. RUIZ,
　W. WILLARD BABCOCK.